Sept. 5, 1950            H. V. REES            2,521,538
PROCESS FOR SYNTHESIS OF HYDROCARBONS AND THE LIKE
Filed June 20, 1945            2 Sheets-Sheet 1
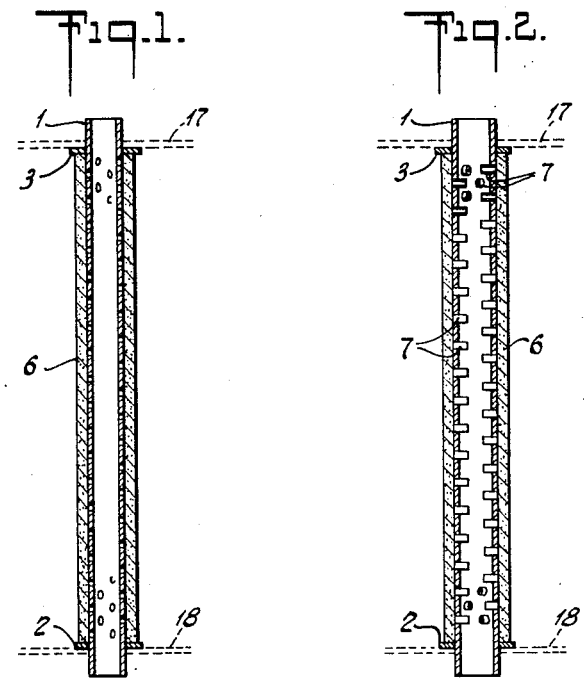
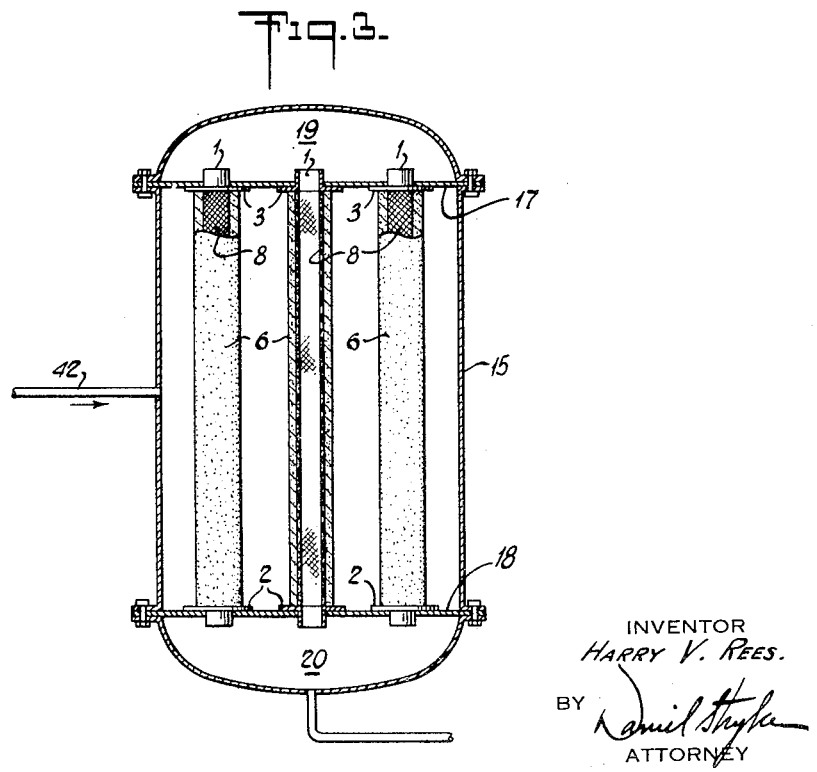
INVENTOR
HARRY V. REES.
BY
ATTORNEY

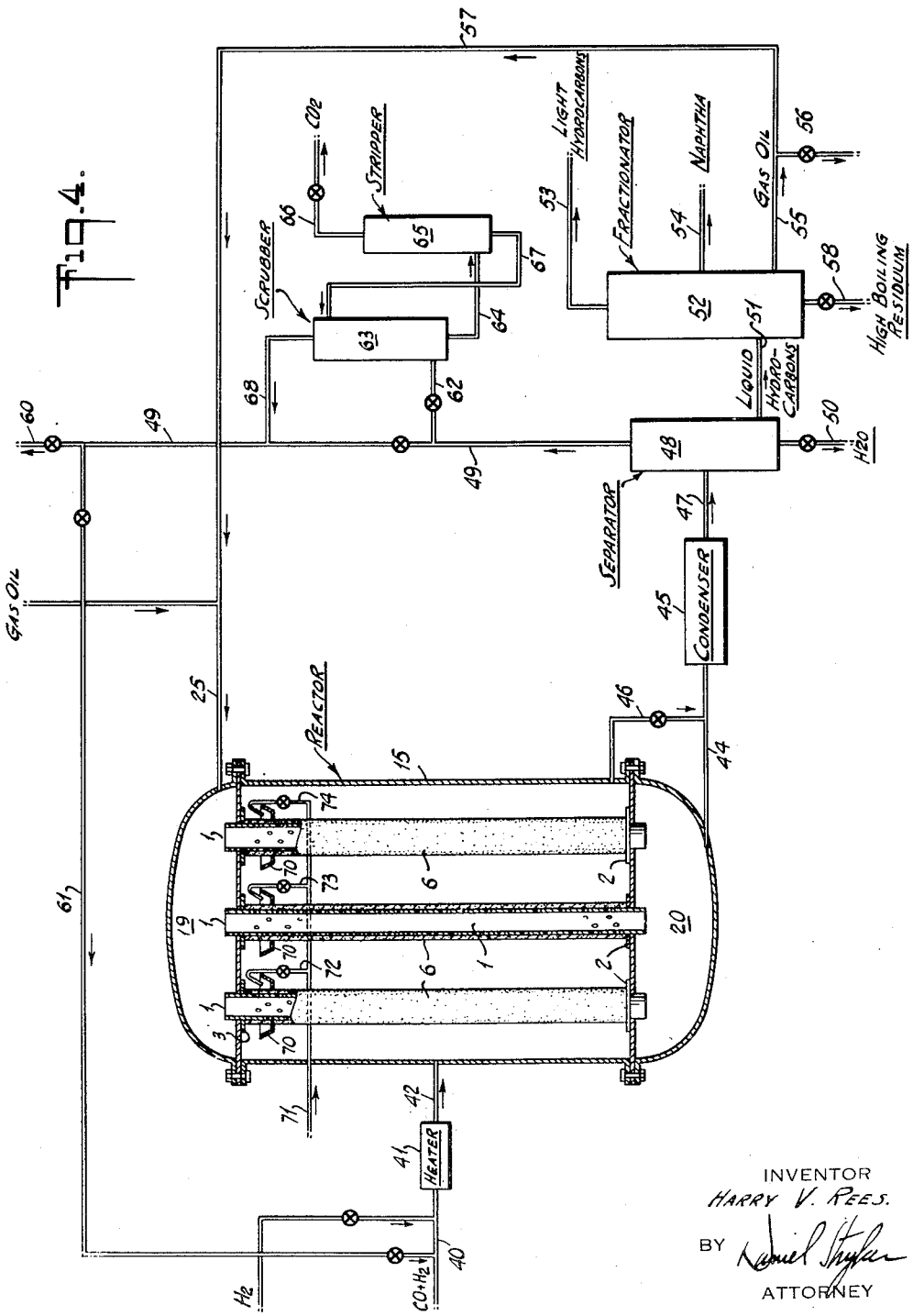

Patented Sept. 5, 1950

2,521,538

UNITED STATES PATENT OFFICE 2,521,538

**PROCESS FOR SYNTHESIS OF HYDRO-
CARBONS AND THE LIKE**

Harry V. Rees, Chappaqua, N. Y., assignor to Texaco Development Corporation, New York, N. Y., a corporation of Delaware Application June 20, 1945, Serial No. 600,473

3 Claims. (Cl. 260—449.6)

This invention relates to a process for performing in predetermined temperature ranges catalytic reactions in which the temperature of the catalyst tends to increase substantially as a result of the exothermic heat of reaction, such as the exothermic catalytic conversion of carbon monoxide and hydrogen into hydrocarbons, oxygenated hydrocarbons and the like.

In accordance with my invention, the catalyst is disposed in a relatively thin, essentially continuous and effective layer on a porous surface such as a perforated tube. A plurality of such perforated tubes coated with or supporting a thin and effective layer of catalyst may be mounted in a reaction unit. The reaction gas preheated to reaction temperature is caused to diffuse through the catalyst layer by means of a slight pressure differential between the two sides of the porous surface, conversion of the reactant gases into the desired products being effected during contact with the catalyst. The heat of reaction is dissipated by means of a liquid coolant which absorbs the excess heat of reaction either by direct contact with the catalyst surface or by an inductive process of heat exchange. The cooling liquid absorbs the excess exothermic heat of reaction and maintains the reaction temperature within the desired range.

The invention more particularly adapts this method to the exothermic catalytic reaction of carbon monoxide and hydrogen to yield hydrocarbons, oxygenated hydrocarbons and the like.

Operating and design problems of the fixed bed process which result from the strongly exothermic nature of the catalytic reaction between carbon monoxide and hydrogen are overcome by means of my invention. Channeling of the reactant gases and local overheating of the catalyst bed are drawbacks in the fixed bed process. Local overheating of the catalyst bed is especially deleterious since it is imperative to keep the reaction temperature within a predetermined range in order to obtain a good yield of the desired products. In the catalytic reaction of carbon monoxide with hydrogen the nature of the products varies with the experimental conditions employed. Either methane, methanol, liquid hydrocarbons in the gasoline range or oxygenated hydrocarbons may be the main product, depending on the temperature, pressure and catalyst used. Furthermore, maximum yields of the desired products are obtained within very narrow temperature limits so that close temperature control is essential. Overheating of the catalyst is also disadvantageous because it causes catalyst degeneration.

In accordance with my invention, channeling of the reactant gases and overheating of the catalyst are avoided by disposing the catalyst in a relatively thin continuous layer, in the range from about 1/64" to 1" in thickness, on a porous surface through which the reactant gases are caused to diffuse by the application of a pressure differential between the two sides of the porous surface on which the catalyst layer is disposed. This differential pressure is of a magnitude sufficient to cause diffusion of the synthesis gas through the catalyst layer and yet insufficient to cause fracture or channeling of the catalyst. During this process of diffusion, conversion of the reactant gases into desired products takes place while a cooling fluid, flowing in heat exchange relationship with the catalyst, absorbs the excess heat of reaction. Provision is made so that the rate of flow of cooling fluid may be adjusted so as to keep the reaction temperature within the desired range.

The cooling fluid employed is preferably a liquid which is substantially non-vaporizable under the conditions of temperature and pressure prevailing within the reaction zone. It may be applied to either the exposed surface of the catalyst layer or to the surface of the supporting member opposite from that upon which the catalyst layer rests, although the latter is preferred when it is desired to avoid contact with the catalyst. Preferably, the liquid flows over the surfaces in the form of a film of liquid or in the form of a relatively shallow body so as to provide a minimum of resistance to flow of gaseous reactants either into, through or away from the catalyst layer.

It is contemplated that when the cooling liquid flows over the surface of the supporting member, opposite from that upon which catalyst layer rests, it will not penetrate, at least to any substantial extent, the pores and thereby cause wetting of the catalyst. Such penetration of the liquid into the pores of the supporting member may be prevented by maintaining a sufficiently high rate of flow of reactant gases and products of conversion therethrough. It may also be prevented by providing tubular projections on each perforation having a length somewhat greater than the depth of the liquid film flowing over the porous supporting member as will be described later in more detail.

The products of the reaction and unreacted synthesis gas which diffuse through the continuous catalyst layer and the liquid coolant then flow into a system wherein the mixture may be separated into its component parts.

More complete conversion of the charge gas may be obtained by recycling to the reaction unit unreacted synthesis gas, with or without any desired portion of the normally gaseous products.

A reaction unit embodying the features of my invention may be used either at atmospheric pressure or at elevated pressures. The porous surface on which the catalyst is disposed in a relatively thin layer may be perforated tubes which will provide adequate support so that the catalyst, even though disposed in thin layers, is able to withstand high pressure.

A feature of my invention is that all of the cooling, if desired, can be accomplished by applying the cooling liquid to the surface opposite from that on which the catalyst layer or film is disposed without the necessity for direct physical contact between this liquid and the catalyst. Thus, when the porous surface consists of perforated metal tubes, with the catalyst on the exterior surface of the tubes, the cooling liquid may be directed onto the interior surface of the tubes.

An advantage of my invention is that a method is provided whereby the temperature of a strongly exothermic catalytic reaction is easily and adequately controlled.

My invention will be illustrated by describing a typical reaction between carbon monoxide and hydrogen. The synthesis gas comprises carbon monoxide and hydrogen obtained from any suitable source and in a molecular proportion which is determined by the type of catalyst used. If an iron catalyst is used, the carbon monoxide and hydrogen will be in a molecular ratio of about 1:1, whereas if a cobalt or nickel catalyst is used, the molecular ratio will be about 1 part of carbon monoxide to 2 parts of hydrogen. The mixture of carbon monoxide and hydrogen in appropriate proportions will henceforth be called synthesis gas.

For purposes of illustration, my invention is described in conjunction with an operation for the manufacture of valuable hydrocarbons suitable for use as motor fuel. A cobalt catalyst promoted with magnesia and thoria and supported on a diatomaceous earth carrier is employed. Consequently, the synthesis gas consists of about 1 molecular part of carbon monoxide and 2 molecular parts of hydrogen.

The method of reaction comprising my invention is more readily understood by reference to the attached drawing.

Figure 1 represents a sectional view of a single reaction tube along its longitudinal axis.

Figure 2 represents a sectional view of a single reaction tube of a modified type along its longitudinal axis.

Figure 3 represents a sectional view of the reaction chamber showing one method of supporting the reaction tubes therein.

Figure 4 is a flow diagram showing how the exothermic reaction between carbon monoxide and hydrogen may be performed employing the method of my invention.

In Figure 1 there is represented a single reaction tube in which the porous catalyst supporting member is a perforated metal tube 1. In place of the perforated metal tube 1, the porous catalyst supporting member may be a wire screen of very fine mesh, e. g., about 40 mesh. The reaction tube has a flange 2 which is rigidly attached to the tube a short distance from the bottom. An additional flange 3 is attached a short distance from the top of the reaction tube and is advantageously removable. The ends of the reaction tube extend a distance of about 5 centimeters beyond the rigid flange 2 and removable flange 3. These extensions advantageously are non-porous. A catalyst layer 6 envelopes and is supported upon the perforated portion of the tube 1.

Figure 2 shows a modified type of reaction tube. It is provided with the same rigid and movable flanges 2 and 3 respectively, the same extensions of the reaction tube beyond the flanges and the same catalyst layer 6, disposed and supported on the outer surface of the reaction tube. However, each perforation of the porous metal surface unites with or merges into a tubular projection 7 extending a sufficient distance, e. g., about ½ to 2 millimeters into the interior of the metal tube to prevent the cooling liquid moving over the member from making physical contact with the catalyst.

The catalyst layer may be disposed on the reaction tubes in a number of ways. With the catalyst I am using for the purposes of illustration, namely, a cobalt catalyst promoted by magnesia and thoria and supported by Filter Cel, this disposition may be accomplished by extruding from a conventional extrusion apparatus a relatively thin cylindrical sheath of catalyst onto the reaction tubes. An aqueous slurry of the catalyst in which the metals exist in the form of their carbonates and which has been mulled to a suitable consistency may be employed for this extrusion. In order to accomplish disposition of the catalyst by this method, the upper flange 3 which is attached to the reaction tubes in Figures 1 and 2 is removed to permit the cylindrical sheath of catalyst to slide directly over the reaction tube as it emerges from the conventional extrusion apparatus. The catalyst layer may be obtained in any desired depth by adjustment of the die of the extrusion machine.

The extruded layer of catalyst must be dried slowly to obtain satisfactory strength. During the drying and reduction of the extruded film of catalyst, there will be substantial shrinkage and allowance must be made for this shrinkage during the extrusion of the catalyst. The thickness of the catalyst layer should be about $\frac{1}{64}''$ to $1''$, preferably $\frac{1}{8}''$ to $\frac{1}{4}''$. A layer of unreduced catalyst is extruded which is substantially thicker than the layer of reduced catalyst which one desires to obtain.

Figure 3 shows a typical reaction unit in which the features of my invention may be incorporated. The reaction unit comprises a cylindrical shell 15 wherein is mounted a plurality of reaction tubes 1 between the tube sheets 17 and 18. In this figure the supporting members consist of very fine wire mesh screens designated by the numeral 8 instead of perforated metal tubes. To the cylindrical shell 15 there are attached heads 19 and 20 by bolted flanges. A rectangular vessel may be substituted for the cylindrical unit shown in Figure 3 and rectangular or hexagonal reaction tubes may be substituted for the cylindrical reaction tubes 1.

The unit is so constructed that it may be readily dismantled into its component parts, namely, cylindrical shell 15, tube sheets 17 and 18, heads 19 and 20 and reaction tubes 1. The reaction tubes 1, after having been coated with a catalyst layer as previously described, are mounted in a reaction unit between the tube sheets 17 and 18. This is most conveniently accomplished by removing the detachable head 19 and the removable tube sheet 17, inserting the individual reaction tubes into the lower tube sheet 18 wherein they may be locked to provide a vapor-tight joint. The tube sheet 17 is then replaced into position by slipping it over the extensions of the reaction tubes 1 so that the corresponding openings in the tube sheets 17 and 18 are in equivalent positions. The tube sheets 17 and 18 are advantageously supported by extension into the bolted flanges by which the detachable heads 19 and 20 are fastened to the cylindrical shell 15. The upper ends of the reaction tubes are secured in tube sheet 17 to provide a vapor-tight joint. The detachable head 19 is then securely fastened to the cylindrical shell 15 and the unit is ready for operation.

It will be noticed that the reaction tubes 1 extend a short equal distance, advantageously about 5 centimeters, above the tube sheet 17. The purpose of this extension of the reaction tubes above the tube sheet 17 is to equalize the flow of cooling liquid through the interior of the plurality of tubes mounted in the reaction unit. Thus an equivalent quantity of heat is absorbed in each reaction tube. The tube ends may be serrated to facilitate distribution of the liquid uniformly over the interior surface of each tube. Moreover, with this arrangement a film of cooling liquid flowing over the interior surface of the reaction tubes may be readily maintained. It is desirable that the heat of reaction be absorbed by a film of liquid flowing over the interior surface of the tube rather than by a stream of liquid flowing therethrough, so as to avoid penetration of liquid into the catalyst and to reduce the resistance of gas flow through the reactor. The flow of liquid through the interior of the reaction tubes may be increased to keep the temperature within the desired range by augmenting the rate at which the cooling liquid is supplied to the detachable head 19.

After the reaction unit is sealed, the catalyst is reduced at a temperature of about 650° to 750° F., preferably at 660° F., with hydrogen which may be introduced through the pipe 42. When the reduction of the catalyst is complete, which can be determined by the amount of water formed in the reduction, the flow of hydrogen is stopped and conditioning of the catalyst is initiated. The conditioning treatment comprises passing the synthesis gas mixture through the catalyst for several hours starting at a temperature of about 200° F. and concluding when the predetermined temperature range at which the reaction is to be carried out is reached. The manner in which this conditioning treatment is performed will be apparent in the description in connection with Figure 4 of the operation of the process which follows.

Figure 4 comprises a flow diaphragm illustrating how the exothermic reaction between carbon monoxide and hydrogen may be performed employing the method of my invention, with a single reaction unit wherein a plurality of perforated reaction tubes is mounted. It is contemplated that two or more of these reaction units may be utilized in parallel or in series, but only one reaction unit is illustrated in the flow diagram for simplicity's sake.

In Figure 4, the synthesis gas which is obtained from a source not shown in the drawing passes through a pipe 40 into a heater 41 wherein it attains the predetermined conversion temperature, namely, 365° to 400° F. From there the synthesis gas is introduced into the reaction unit through the inlet pipe 42. As the synthesis gas, which may be either at atmospheric or elevated pressure, diffuses through the continuous catalyst layer by the application of a pressure differential between the two sides of the catalyst layer, substantial conversion occurs and the desired products, which in this case comprise liquid hydrocarbons in the gasoline range, are produced. Considerable heat is evolved as a result of the strongly exothermic nature of the reaction.

The stream of cooling fluid flows through the interior of the reaction tubes thereby absorbing the heat of reaction. The rate of flow of this cooling fluid is controlled by the rate at which the cooling liquid is supplied to the interior of the detachable head 19 through the inlet pipe 25. The rate of flow of this cooling liquid is variable so that it may keep the temperature of the catalyst within the predetermined conversion range. As previously described, the flow of cooling liquid through the plurality of reaction tubes is equalized by extending the reaction tubes an equal distance beyond the tube sheet 17. With this arrangement, it is also possible to maintain a film of liquid flowing over the interior surface of the tubes. The rate at which the cooling liquid flows through the tubes is proportional to the rate at which it is supplied to the detachable head 19.

The cooling liquid, together with the products of the reaction and the unreacted synthesis gas which have diffused into the interior of the reaction tubes, flows into the interior of the collecting head 20. From there, this mixture of cooling liquid, unreacted synthesis gas and products, passes through a pipe 44 into a condenser 45. From the condenser 45 wherein the high boiling constituents are liquefied, the mixture travels along a pipe 47 to a separator 48 from which the gaseous constituents comprising carbon monoxide, hydrogen, carbon dioxide and the normally gaseous hydrocarbons are removed through a pipe 49. The liquid portion, comprising the normally liquid hydrocarbons, passes through a pipe 51 into a fractionating unit 52. The aqueous phase may be removed from the separator 48 through a pipe 50.

In the fractionating unit 52, the liquid hydrocarbons are separated into various useful petroleum fractions. The light hydrocarbons ($C_5$'s and $C_6$'s) are removed through a pipe 53 and naphtha is removed through a pipe 54; both of these then proceed to storage tanks, not shown in the diagram. The gas oil is separated through a pipe 55 and may be either led to storage, not shown, through a pipe 56, or may be returned through a pipe 57 and the inlet pipe 25 to the head 19 where it may be used to renew the supply of cooling liquid. The high boiling residuum is removed from the fractionating unit 52 through an exit pipe 58.

The gaseous constituents, namely, carbon monoxide, hydrogen, carbon dioxide and the normally gaseous hydrocarbons which have been removed from the separator 48 through the pipe 49 may be reintroduced directly as recycle gas into the reaction unit through a pipe 61 which leads to the feed line 40 or they may be vented in whole or in part through a vent 60.

Alternatively, the carbon dioxide may be stripped from this recycle gas and utilized in the preparation of charge gas by reaction with methane. If carbon dioxide is to be used in this fashion, the gaseous constituents which have been removed from the separator 48 through the pipe 49 pass through a pipe 62 into a scrubber 63 wherein the carbon dioxide is absorbed in a suitable fluid medium, e. g., triethanolamine solution. This scrubber 63 is connected via a pipe 64 with a stripper 65 in which the carbon dioxide absorbent may be regenerated after it has been saturated with carbon dioxide. The carbon dioxide resulting from this regeneration is led through a pipe 66 to a unit, not shown, wherein synthesis gas is prepared. From the stripper 65 the regenerated absorbent solution is returned to the scrubber 63 through a pipe 67. The carbon monoxide, hydrogen and normally gaseous hydrocarbons leave the scrubber 63 by a pipe 68 through which they may be returned through the pipe 61 to the feed line 40 from where they may be introduced into the reaction unit as recycle gas through the heater 41 and the inlet pipe 42. This carbon dioxide stripped gas may also be vented in whole or in part through the vent 69.

Mention was previously made of applying the cooling liquid on to the exterior surface of the catalyst. In such case, a portion of the cooling liquid will diffuse through the catalyst layer into the interior of the reaction tubes along with the vaporous products of reaction. In doing so the liquid may also serve to wash waxy products of reaction from the catalyst.

This cooling liquid may be applied to the exterior surface of the catalyst continuously or intermittently, and this may be done while removing the major portion of the heat in the cooling liquid which flows over the interior surface of the reaction tube or tubes. In such case, the cooling liquid applied to the catalyst surface serves mainly for the purpose of washing the catalyst during continuous operation of the process.

Various means may be employed for applying the cooling liquid to the exterior surface of the catalyst. For example, annular weir boxes may be provided at the upper portion of each reaction tube. Cool liquid may be introduced from a pipe 71 and through branch pipes 72, 73 and 74, etc., to each weir box in the appropriate amount. The annular space between the bottom of the weir box and the adjacent exterior surface of the catalyst surrounding the reaction tube provides an annular orifice through which the liquid flows in a continuous film over the exterior surface of the catalyst.

The cooling liquid and any waxy material washed from the catalyst collects in the lower portion of the reactor and is drawn off through the pipe 46 communicating with the pipe 44. In this way the withdrawn liquid is passed through the fractionating equipment and from which it may be recycled.

While not shown, provision may be made for drawing off a portion of the reactant gas from the central portion of the reactor and recycling it with or without partial cooling prior to return with fresh feed gas to the interior of the reactor.

It will be understood that this example is illustrative of the application of the invention and no limitations are intended thereby. Many modifications immediately suggest themselves and are included within the scope of the invention. Other systems of catalyst disposition are contemplated such as a stationary porous cylinder on which the catalyst is disposed in a thin continuous layer and which is cooled by a plurality of sprays of cooling liquid directed onto the catalyst surface as the reactant gases diffuse through the catalyst layer.

It is contemplated that a reaction tube may consist of an inner and outer porous surface. Herein the annular space may be filled with catalytic material so as to form an essentially continuous layer through which the reactant gases will diffuse.

The invention may be adapted to exothermic reactions other than the catalytic conversion of carbon monoxide and hydrogen into valuable products. An iron or nickel catalyst may be employed equally as well as a cobalt catalyst in the reaction of carbon monoxide and hydrogen. A supported or unsupported catalyst may be used. Other means of disposing the catalyst in relatively thin and effective layers may be employed besides the extrusion method described. The conditions of temperature and pressure under which the reaction occurs may be varied so that other valuable products such as oxygenated hydrocarbons are obtained.

Obviously many modifications and variations of the invention, as hereinbefore set forth, may be made without departing from the spirit and scope thereof and therefore only such limitations should be imposed as are indicated in the appended claims.

I claim:

1. In a process for effecting synthesis of hydrocarbons and oxygenated hydrocarbons from carbon monoxide and hydrogen in the presence of a solid synthesis catalyst wherein said catalyst is maintained stationary within the reaction zone and at least a portion of the heat liberated by the reaction is removed by indirect heat exchange between the catalyst and a cooling liquid, the improvement which comprises disposing said synthesis catalyst in a continuous permeable layer having a thickness within the range of from about 1/64 to about 1 inch on one surface of relatively thin porous vertical supporting wall within the reaction zone, passing a mixture of carbon monoxide and hydrogen under synthesis reaction conditions through said layer of synthesis catalyst and thereafter through said wall thereby effecting reaction of carbon monoxide with hydrogen accompanied by the liberation of heat, continuously flowing a liquid coolant at a temperature lower than said reaction temperature in a thin stream over the surface of the porous supporting wall on the opposite side of said wall from the catalyst and out of contact with said catalyst, and discharging said coolant and the resulting reaction products from said reaction zone.

2. In a process for effecting synthesis of hydrocarbons and oxygenated hydrocarbons from carbon monoxide and hydrogen in the presence of a solid synthesis catalyst wherein said catalyst is maintained stationary within the reaction zone and at least a portion of the heat liberated by the reaction is removed by indirect heat exchange between the catalyst and a cooling liquid, the improvement which comprises disposing said synthesis catalyst in a continuous permeable layer having a thickness within the range of from about 1/64 to about 1 inch on one surface of a relatively thin walled porous conduit disposed vertically within the reaction zone, passing a mixture of carbon monoxide and hydrogen under synthesis reaction conditions through said layer of synthesis catalyst and thereafter through the wall of said conduit thereby effecting reaction of carbon monoxide with hydrogen accompanied by the liberation of heat, continuously flowing a liquid coolant at a temperature lower than said reaction temperature in a thin stream over the surface of the wall of said conduit on the opposite side of said wall from said catalyst and out of contact with said catalyst, and discharging said coolant and the resulting reaction products from said reaction zone.

3. In a process for effecting synthesis of hydrocarbons and oxygenated hydrocarbons from carbon monoxide and hydrogen in the presence of a solid synthesis catalyst wherein said catalyst is maintained stationary within the reaction zone and at least a portion of the heat liberated by the reaction is removed by indirect heat exchange between the catalyst and a cooling liquid, the improvement which comprises disposing said synthesis catalyst in a continuous permeable layer having a thickness within the range of from about $1/64$ to about 1 inch on the exterior surface of a relatively thin walled cylindrical porous conduit disposed vertically within the reaction zone, passing a mixture of carbon monoxide and hydrogen under synthesis reaction conditions through said layer of synthesis catalyst and thereafter through the wall of said conduit thereby effecting reaction of carbon monoxide with hydrogen accompanied by the liberation of heat, continuously flowing a liquid coolant at a temperature lower than said reaction temperature in a thin stream along the inner surface of said conduit and out of contact with said catalyst, and discharging said coolant and the resulting reaction products from said reaction zone.

HARRY V. REES.

REFERENCES CITED

The following references are of record in the file of this patent:

UNITED STATES PATENTS

| Number | Name | Date |
|---|---|---|
| Re. 22,415 | Barr | Jan. 4, 1944 |
| 1,309,623 | Henwood | July 15, 1919 |
| 1,685,759 | Walter | Sept. 25, 1928 |
| 1,900,715 | Jaeger | Mar. 7, 1933 |
| 2,196,188 | Bone et al. | Apr. 9, 1940 |
| 2,256,622 | Murphree | Sept. 23, 1941 |
| 2,271,646 | Kassel | Feb. 3, 1942 |
| 2,279,153 | Wilcox | Apr. 7, 1942 |
| 2,287,092 | Duftschmid et al. | June 23, 1942 |
| 2,378,651 | Matuszak | June 19, 1945 |

FOREIGN PATENTS

| Number | Country | Date |
|---|---|---|
| 474,191 | Great Britain | Oct. 27, 1937 |